US009094571B2

(12) United States Patent
Yu et al.

(10) Patent No.: US 9,094,571 B2
(45) Date of Patent: Jul. 28, 2015

(54) VIDEO CHATTING METHOD AND SYSTEM

(71) Applicant: Tencent Technology (Shenzhen) Company Limited, Shenzhen Guangdong (CN)

(72) Inventors: Shang Yu, Shenzhen Guangdong (CN); Feng Rao, Shenzhen Guangdong (CN); Yang Mo, Shenzhen Guangdong (CN); Jun Qiu, Shenzhen Guangdong (CN); Fei Wang, Shenzhen Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/239,204

(22) PCT Filed: Feb. 22, 2013

(86) PCT No.: PCT/CN2013/071793

§ 371 (c)(1), (2) Date: Feb. 17, 2014

(87) PCT Pub. No.: WO2013/152639

PCT Pub. Date: Oct. 17, 2013

(65) Prior Publication Data

US 2014/0192136 A1 Jul. 10, 2014

(30) Foreign Application Priority Data

Apr. 11, 2012 (CN) .......................... 2012 1 0104867

(51) Int. Cl.
*H04N 7/14* (2006.01)
*H04L 12/18* (2006.01)

(52) U.S. Cl.
CPC ........... *H04N 7/147* (2013.01); *H04L 12/1813* (2013.01)

(58) Field of Classification Search
CPC ......... H04N 7/147; H04N 7/157; H04N 7/15; H04N 21/4788; H04M 1/72555
USPC ..................... 348/14.01–14.16; 370/260–261
See application file for complete search history.

(56) References Cited

U.S. PATENT DOCUMENTS

2010/0073458 A1* 3/2010 Pace ........................... 348/14.16
2012/0206560 A1* 8/2012 Setton ........................ 348/14.08
2012/0268553 A1* 10/2012 Talukder .................... 348/14.08

FOREIGN PATENT DOCUMENTS

CN 101021899 A 8/2007
CN 101930618 A 12/2010
JP 2003-141563 A 5/2003
KR 2002-0033480 A 5/2002

OTHER PUBLICATIONS

International Search Report, dated May 23, 2013, International Patent Application No. PCT/CN2013/071793, pp. 1-4, State Intellectual Property Office of China, Beijing, China.

* cited by examiner

*Primary Examiner* — Stella Woo
(74) *Attorney, Agent, or Firm* — Brinks Gilson & Lione

(57) ABSTRACT

A video chatting method and system are provided. The method and system describe collection of facial vector data, audio data, and interactive motion information of a user of a first client. The collected data may be transmitted to a second client. The second client, in turn, may generate a virtual avatar model of the user of the first client based on the received data. The second client may further display the virtual model, play sound in the audio data. The second client may also render the interactive motion information and facial data information of a user of the second client, and generate and display a virtual avatar model of the user of the second client. The provided method and system may decreases amount of data that may be transferred over the network. This may allow data transmission rate during video communication to be high enough for a smooth operation.

14 Claims, 4 Drawing Sheets

First client 11

Second client 12

VIDEO CHATTING METHOD AND SYSTEM

The present application is the national phase of International Application No. PCT/CN2013/071793, titled "VIDEO CHATTING METHOD AND SYSTEM", filed on Feb. 22, 2013, which claims the priority to Chinese Patent Application No. 201210104867.2 entitled "VIDEO CHATTING METHOD AND SYSTEM" filed on Apr. 11, 2012 with State Intellectual Property Office of PRC, both of which are incorporated herein by reference in entirety.

FIELD

The present invention relates to the field of computer technology and particularly to a method and system for video communication.

BACKGROUND

Along with the widespread use of mobile terminals, maturity of wireless network technologies has increased. Hence, communication by voice conversation and text message may no longer meet people's expectations and demands. Video and audio communication, especially for conducting business, has grown in popularity. While wireless networks may have a growing number of users, mobile networks has not seen that level of popularity and penetration in terms of number of users. Slow data-transfer speeds and relatively high costs may be some of the reasons obstructing the use of mobile networks and development of instant video communication on mobile networks. Further, performance capabilities of mobile terminals may also adversely affect user experience, for example low definition cameras on mobile terminals may affect user experience during video communication.

Instant communication software installed on a mobile terminal may, generally, enable video and/or audio communication. Usually, such software operates by recording audio and video by microphone and camera respectively, compressing the audio and video data synchronously for transmission via network, and playing video images at another client, receiving the communication. Such communication may also be achieved by instantly transforming video images via a virtual camera, displaying video images as virtual profile video data using face identification technology, transmitting the generated video data via the network, and playing the video images at the receiving client.

Typically, during video communication using mobile terminals, video data transmitted via a mobile network may cause heavy network traffic, i.e. high bandwidth usage. Limited by the speed, bandwidth and costs of existing mobile network, data transmission during video communication at mobile terminals may be slow and expensive.

SUMMARY

The present disclosure provides a method and system for video communication, to address the technical issue of low speed and high costs of video data transmission during video communication at mobile terminals.

To address this issue, the following technical solutions are provided and described using various embodiments.

A first method for video communication may include at least the following steps. Facial video data and audio data of a user of a first client may be collected. Further, interactive motion information received by the first client may be from an interactive UI component library. Facial vector data of the user of the first client in the facial video data may be identified. The facial vector data and the audio data may be transmitted to a second client. The second client, in turn, may render the facial vector data of the user of the first client to generate a virtual profile model corresponding to the user of the first client. The second client may also play the sound in the audio data of the user of the first client synchronously with the virtual profile model of the user.

Further, the interactive motion information may also be transmitted to the second client. The second client may render the interactive motion information together with facial data information of a user of the second client to generate a virtual profile model corresponding to the user of the second client. The second client may also display the virtual profile model of the user of the second client synchronously with the display of the virtual profile model of the user of the first client.

A second method for video communication may include at least the following steps. The facial video data of a user of a first client may be collected and facial vector data of the user may be identified according to the facial video data. The facial vector data of the user of the first client may be transmitted to a second client. The second client may render the facial vector data of the user of the first client and generate a virtual profile model of the user of the first client. The second client may display the virtual profile model of the user of the first client.

In a third method for video communication at least the following steps may be involved. Facial vector data of a user of a first client transmitted by the first client may be received. The received facial vector data of the user of the first client may be rendered to generate a virtual profile model of the user of the first client. The virtual profile model of the user of the first client may then be displayed.

In another aspect, a system for video communication may include a facial video data collection unit which collects facial video data of a user of a first client and identify facial vector data of the user of the first client according to the facial video data. A data transferring unit of the system may transmit the facial vector data to a second client. The second client may render the facial vector data of the user of the first client to generate a virtual profile model of the user of the first client. The second client may further display the virtual profile model of the user of the first client.

In another example system for video communication, a receiving unit may receive facial vector data of a user of a first client transmitted by the first client. A virtual profile generation unit may render the facial vector data of the user of the first client to generate a virtual profile model of the user of the first client. A display unit may then display the generated virtual profile model.

The above embodiments have at least the following advantages. Other advantages and characteristics of the embodiments will be obvious to a person skilled in the art. The first client may transmit facial vector data of a user of the first client to the second client. The second client, after processing the received data, may generate and display the virtual profile of the user of the first client. During the above video communication, what may be transmitted via network is the vector data. This greatly reduces amount of data transferred and thus reduces bandwidth requirement. This, in turn, allows smooth operation even using low bandwidth and/or low speed networks, such as mobile networks. While, the physical data transfer speed may not be increased by the provided solution, by reduction in the amount of data required for the video communication, the video communication may proceed at a faster speed, without a lag for data transfer. The effectively faster data transmission speeds and decreased network traffic costs may attract more users to use applications using such techniques for video communication via mobile networks. And at the same time, virtual profile may enable alteration of user's actual appearance. This may provide a smoother communication and an easier way to bring users closer to each other. Additionally, communication using virtual profile may hide a user's actual appearance and yet maintain a realistic communication scene. This may provide entertainment and at the same time protect the privacy of a user. This may further make using the aspects of the video chatting method and system provided suitable for communication with strangers.

BRIEF DESCRIPTION OF THE DRAWINGS

In order to give a clearer description of technical solutions provided in the embodiments of the present disclosure, a brief introduction to the drawings in the description of the embodiments is provided below. Obviously, the drawings described in the following are just illustration of some embodiments of the present disclosure, and other drawings may be obtained by those skilled in the art in light of these drawings without any creative labor.

DETAILED DESCRIPTION OF THE EMBODIMENTS

Figures 1, 2:
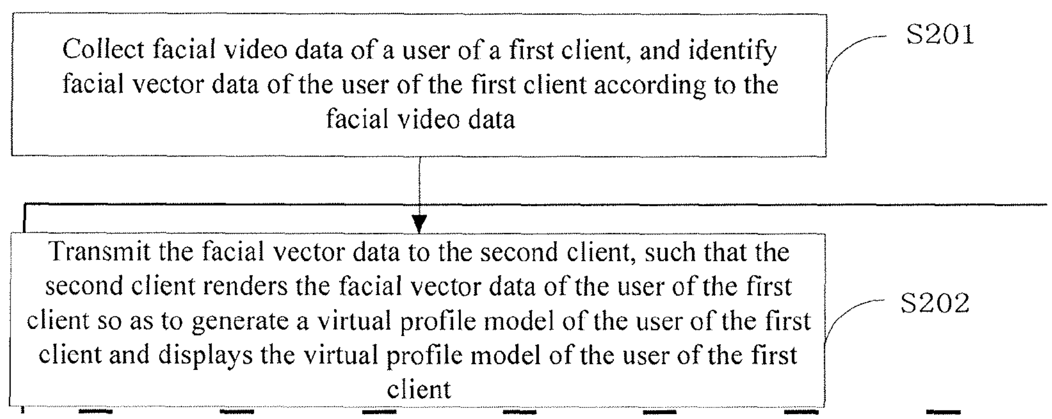
FIG. 1 is a schematic structural diagram of an example use case scenario according to an embodiment.
FIG. 2 is an example flow diagram of an example method for video communication according to an embodiment.

In the following, the technical solutions of the embodiments of the present invent will be clearly and completely described in combination with the drawings. Obviously, the described embodiments are just some of the embodiments of the present disclosure, but not all of the embodiments. Any other embodiments obtained by those skilled in the art based on the embodiments of the present disclosure without any creative labor fall within the scope of protection of the present disclosure.

In an example embodiment, a first client may identify facial vector data of a user of a first client according to collected facial video data of the user of the first client. The first client may transmit the facial vector data of the user of the first client to a second client. The second client may generate a virtual profile model of the user of the first client using the received facial vector data of the user of the first client. The second client may further display the virtual profile model of the user of the first client.

In an embodiment of the method for video communication, at least the following steps may be performed. Facial video data and audio data of a user of a first client may be collected. Interactive motion information received by the first client may also be collected. The interactive motion may be from an interactive UI component library.

The facial video data may be used to identify facial vector data of the user of the first client. The facial vector data and audio data may be transmitted to a second client. The second client may render the facial vector data of the user of the first client to generate a virtual profile model corresponding to the user of the first client. The second client may also display the virtual profile model of the user of the first client. Further, the second client may synchronize and play the sound in the audio data of the user of the first client along with the virtual profile model.

The interactive motion information may also be transmitted to the second client. The second client may render the interactive motion information along with the facial data information of a user of the second client when generating a virtual profile model corresponding to the user of the second client. The second client may display the virtual profile model of the user of the second client simultaneously with the virtual profile model of the user of the first client.

Another embodiment of the method for video communication, may include collecting facial video data of a user of a first client, and identifying facial vector data of the user of the first client according to the facial video data. The method may further include transmitting the facial vector data of the user of the first client to a second client. The second client may render the facial vector data of the user of the first client and generate a virtual profile model of the user of the first client. The second client may then display the virtual profile model of the user of the first client.

In another embodiment of the method for video communication, at least the following steps may be included. The method may initially involve receiving facial vector data of a user of a first client transmitted by the first client. The facial vector data of the user of the first client may be rendered to generate a virtual profile model of the user of the first client. The generated virtual profile model of the user of the first client may then be displayed.

In another aspect, an embodiment of a system for video communication, may include a facial video data collection unit which collects facial video data of a user of a first client. The facial video data collection unit may also identify facial vector data of the user of the first client according to the facial video data.

The system may further include a data transferring unit that transmits the facial vector data to a second client. The second client, in turn, may render the facial vector data of the user of the first client to generate a virtual profile model of the user of the first client. The second client may also display the virtual profile model of the user of the first client.

Another embodiment of the system for video communication, may include a receiving unit that receives facial vector data of a user of a first client transmitted by the first client. A virtual profile generation unit of the system may render the facial vector data of the user of the first client to generate a virtual profile model of the user of the first client. A display unit may display the virtual profile model of the user of the first client.

Detailed description in conjunction with specific embodiments of the present invention is provided further.

The First Embodiment

FIG. 1 is a schematic structural diagram of use case scenario according to an embodiment. The use case may include a first client 11 and a second client 12. The first client 11 and the second client 12 may be instant communication software installed on communication enabled devices, such as a mobile phone, a tablet computer such as an iPad, or a Personal Computer such as desktop or a laptop computer. The first client 11 and the second client 12 may perform video communication via communication networks. The first client 11 may obtain facial vector data and audio data of a user who may be currently using the first client 11 (hereinafter referred to as "user of the first client"). The first client may also transmit the facial vector data and audio data to the second client 12 via the communication network. The second client 12 may generate a virtual profile model according to the facial vector data of the user of the first client. The second client may further display the generated virtual profile model and play the sound in the audio data. The audio data may be played synchronously.

FIG. 2 is an example flow diagram of an example method for video communication according to an embodiment described further.

In S201, facial video data of a user of a first client may be collected. Further, facial vector data of the user of the first client may be identified according to the facial video data of the user of the first client.

In an embodiment, the first client 11 may collect the facial video data of the user of the first client by a camera. The first client 11 may analyze each frame of the captured images. Based on the analysis, the first client 11 may identify the facial vector data of the user of the first client. The facial vector data may include shape of face, motion of head, shape and position of eyes, shape and position of eyebrows, shape and position of nose, shape of mouth and degree of lip-moving, and change of facial expression, and other such features and/or characteristics of the collected data.

In S202, the facial vector data of the user of the first client may be transmitted to the second client 12. The second client 12 may render the facial vector data of the user of the first client to generate a virtual profile model of the user of the first client. The second client 12 may also display the virtual profile model of the user of the first client.

Figure 3:
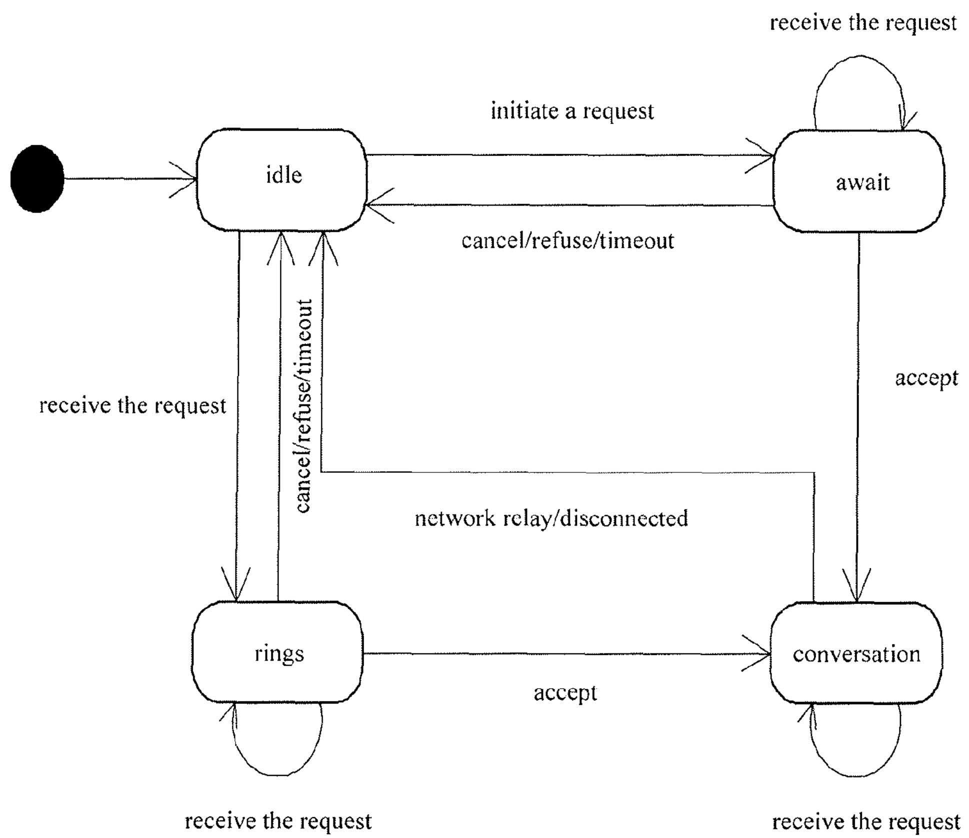
FIG. 3 is a schematic state transition diagram of an example communication network module according to an embodiment.

In an embodiment, the first client 11 may transmit the facial vector data to the second client 12 via a communication network module. The communication network module may be responsible for transmission of data and instructions for video communication between the user of the first client and a user who may be currently using the second client 12 (hereinafter referred to as "user of the second client"). The communication network module may login to a server. The communication network module may maintain an online status using heartbeat packets. The communication network module may also allow querying online state of another user. Additionally, the communication network module may initiate, accept or refuse a conversation request. The communication network module may also maintain a current conversation state. FIG. 3 provides a schematic state transition diagram of an example communication network module.

In an embodiment, the first client may transmit facial vector data of the user of the first client to the second client. The second client, after processing the received data, may generate and display the virtual profile model of the user of the first client. During the above video communication, what may be transmitted via the communication network is the facial vector data. This may, relatively, reduce data transferred over the network, compared to a typical video communication. The lower network bandwidth requirement may allow smoother operation even when using mobile networks. The faster data transmission speeds and decreased network traffic costs may attract more users to use applications using such techniques for video communication via mobile networks. And at the same time, virtual profile may enable alteration of user's actual appearance. This may provide a smoother communication and an easier way to bring users closer to each other. Additionally, communication using virtual profile may hide a user's actual appearance and yet maintain a realistic communication scene. This may provide entertainment and at the same time protect the privacy of a user. This may further make using the aspects of the video chatting method and system provided suitable for communication with strangers.

The Second Embodiment

The second embodiment may include all of the features described earlier with regard to the first embodiment and may further include the following features.

The first client 11 receives a command or trigger indicating and interactive motion button chosen by the user of the first client. The interactive motion button may be one of several from an interactive UI component library. The first client may identify the interactive motion button, and obtain interactive motion information corresponding to the interactive motion button selected. The interactive UI component library may include several types of interactive motion buttons, such as a face touch interactive motion button and a specific function interactive motion button.

In an example embodiment, the user of the first client may select a position on the face where an interactive motion is desired. The user may indicate the position on the face by performing a click on a face touch interactive motion button followed by a click at the desired position on the face. A special effect motion corresponding to the selected interactive motion button may be generated at the selected position. Alternatively, or in addition, a corresponding special motion may be generated at a default location on the face if a specific function interactive motion button.

The first client 11 may transmit the interactive motion information to the second client 12. The second client 12 may renders the interactive motion information along with the facial data information of the user of the second client so as to generate a virtual profile model of the user of the second client. The second client 12 may then display the virtual profile model of the user of the second client.

In an embodiment, the user of the first client may choos the face touch interactive motion button from the interactive UI component library and click the position on the face followed by the face touch interactive motion button. This may identify the interactive motion information, which may include the meaning, or description, of the motion button and the position on the face where the interactive motion is to be performed, where the face was touched and/or clicked. The first client may transmit the interactive motion information including the meaning of the motion button and the position where the face is touched and clicked to the second client 12. The second client 12 may then generate and output the interactive motion to the user of the second client 12. The interactive motion may be, for example, a slight tap, a kiss, a slap or a nod, or any other expression or action. The position information included in the interactive motion information may indicate the corresponding position on the face where the interactive motion information is to be performed or displayed. The interactive motion information may also include other particulars regarding the motion or action to be performed and/or displayed.

In an embodiment, the user of the first client may choose the specific function interactive motion button from the interactive UI component library. The user of the first client may identify the interactive motion information which may include the meaning of the specific function interactive motion button. The first client may transmit the meaning of the interactive motion button to the second client 12, so that the second client 12 may generate and outputs the interactive motion. The interactive motion may further include animations or other ways of presenting actions such as lightning, throwing eggs, or any other such special effect at the corresponding position in the face.

The second client 12 may display the virtual profile model of the user of the second client along with the display of the virtual profile model of the user of the first client.

The first client 11 may receive an instruction, or command, indicating triggering of the interactive motion button by the user of the first client. The interactive motion button may be clicked, or chosen, from the interactive UI component library. The first client may identify the clicked interactive motion button, and obtain the corresponding interactive motion information. The first client may then transmit the interactive motion information to the second client 12. The second client 12 may display the virtual profile model of the user of the second client with a special effect corresponding to the interactive motion selected by the user of the first client. This may provide a fun and interactive experience during the communication between the users.

The Third Embodiment

Along with the features of the first embodiment, the third embodiment may include the following features.

The first client 11 may collect audio data of the user of the first client. The first client 11 may collects audio data of the user of the first client substantially simultaneously when collecting of the facial video data of the user of the first client.

The first client 11 may mark the facial vector data and the audio data of the user of the first client with a timestamp. The first client 11 may transmit the audio and video data to the second client 12. The client 12 may display the virtual profile model of the user of the first client and plays the sound from the audio data synchronously based on the timestamp.

The first client 11 may transmit the facial vector data and the audio data to the second client 12 after marking them with the timestamp. Therefore, the second client 12 may be able to synchronize the display of the virtual profile model of the user of the first client with the playback of the sound in the audio data. The timestamp may help the synchronization of the display of the facial video data and audio playback. Since the facial vector data and audio data may be transmitted and received by the second client via the network, the visual and audio effects may get out of synch. Hence, addressing the issue of lack of synchronization between voice and lip-moving may be helpful.

The Fourth Embodiment

Figure 4:
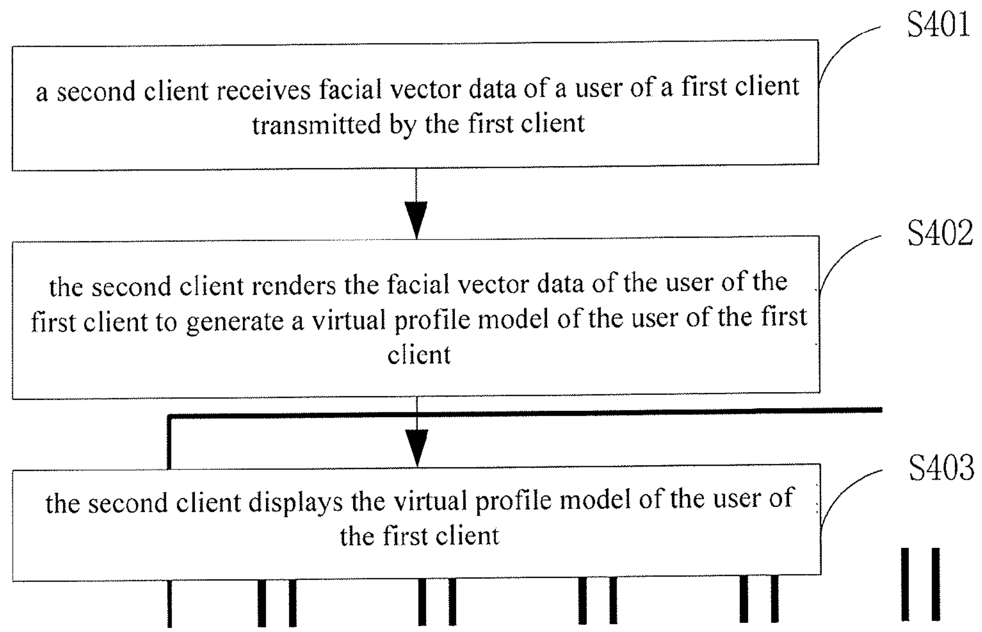
FIG. 4 is an example flow diagram of an example method for video communication according to another embodiment.

FIG. 4 an example flow diagram of an example method for video communication according to another embodiment which is described in detail further.

In S401, a second client 12 may receive facial vector data of a user of a first client transmitted by the first client 11.

The facial vector data of the user of the first client may include shape of face, motion of head, shape and position of eyes, shape and position of eyebrows, shape and position of nose, shape of mouth and degree of lip-moving, and change of facial expression, and any other feature or characteristic of the user of the first client.

In S402, the second client 12 may render the facial vector data of the user of the first client to generate a virtual profile model of the user of the first client.

In S403, the second client 12 may display the virtual profile model of the user of the first client.

In an example embodiment, the second client 12 may perform cartoon rendering to the facial vector data of the user of the first client to generate a virtual cartoon profile model of the user of the first client. The second client 12 may further display the virtual cartoon profile model of the user of the first client. This may provide a fun and richer user interactive experience.

In another example embodiment, the second client 12 may display the virtual profile model of the user of the first client and synchronously play corresponding audio data. The synchronization may be performed according to a timestamp marked by the first client 11 in the facial vector data and audio data. The sound played and the lip-movement, or any other displayed effect of the user of the first client, may thus be synchronized.

Thus, the second client 12 may receive the facial vector data of the user of the first client transmitted by the first client 11. The second client 12 may render the received facial vector data of the user of the first client to generate and display the virtual profile model of the user of the first client. In this case, the facial vector data may be transferred over the network. Thus, compared to a typical video communication technique in which images of the first user may have to be transferred, the provided solution may reduce data to be transferred over the network. This may enable smooth operation even using normal mobile networks which generally have lower bandwidths. The solution may thus provide high transmission speeds and reduced network traffic cost.

The Fifth Embodiment

In addition to the features described in the fourth embodiment, the fifth embodiment may further include the features described below.

The second client 12 may receive interactive motion information transmitted by the first client 11.

The interactive motion information may be obtained by identifying the interactive motion button chosen by the user of the first client from the interactive UI component library. The interactive UI component library may include a face touch interactive motion button and the specific function interactive motion button among several other interactive motion buttons.

The second client 12 may render the interactive motion information together with the facial data information of the user of the second client to generate a virtual profile model of the user of the second client.

The second client 12 may render the interactive motion information and the facial data information of the user of the second client synchronously to generate a client virtual profile model containing interactive motions.

The second client 12 may display the virtual profile model of the user of the second client.

In an example embodiment, the second client 12 may display the virtual profile of the user of the second client simultaneously with the display of the virtual profile model of the user of the first client.

Thus, the second client 12 may receive the interactive motion information transmitted by the first client 11. The second client 12 may then jointly render the interactive motion information together with the facial data information of the user of the second client. The second client 12 may generate and outputs the rendered virtual profile model of the user of the second client. This may provide an entertaining, fun and interactive experience during the communication between users.

The Sixth Embodiment

Figure 5:
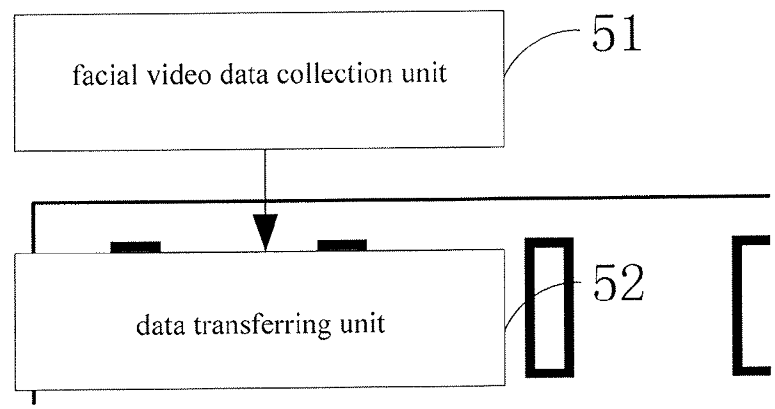
FIG. 5 is a schematic structural diagram of an example system for video communication.

FIG. 5 is a schematic structural diagram of an example system for video communication. FIG. 5 only illustrates parts of the system relevant for the description of the further embodiment. The device may be a software unit, a hardware unit or a combination of both, installed on or used with a mobile terminal.

The video communication system may include a facial video data collection unit 51 and a data transferring unit 52.

The facial video data collection unit 51 may collect facial video data of a user of a first client. The facial video data collection unit 51 may also identify facial vector data of the user of the first client according to the facial video data.

The data transferring unit 52 may transmit the facial vector data of the user of the first client to the second client 12. The second client 12 may render the facial vector data of the user of the first client to generate a virtual profile model of the user of the first client. The second client 12 may also display the virtual profile model of the user of the first client.

The video communication system according to this embodiment may be used in the aforesaid corresponding first method embodiment, details of which can be referred to in the description of the aforesaid first embodiment.

The Seventh Embodiment

Figure 6:
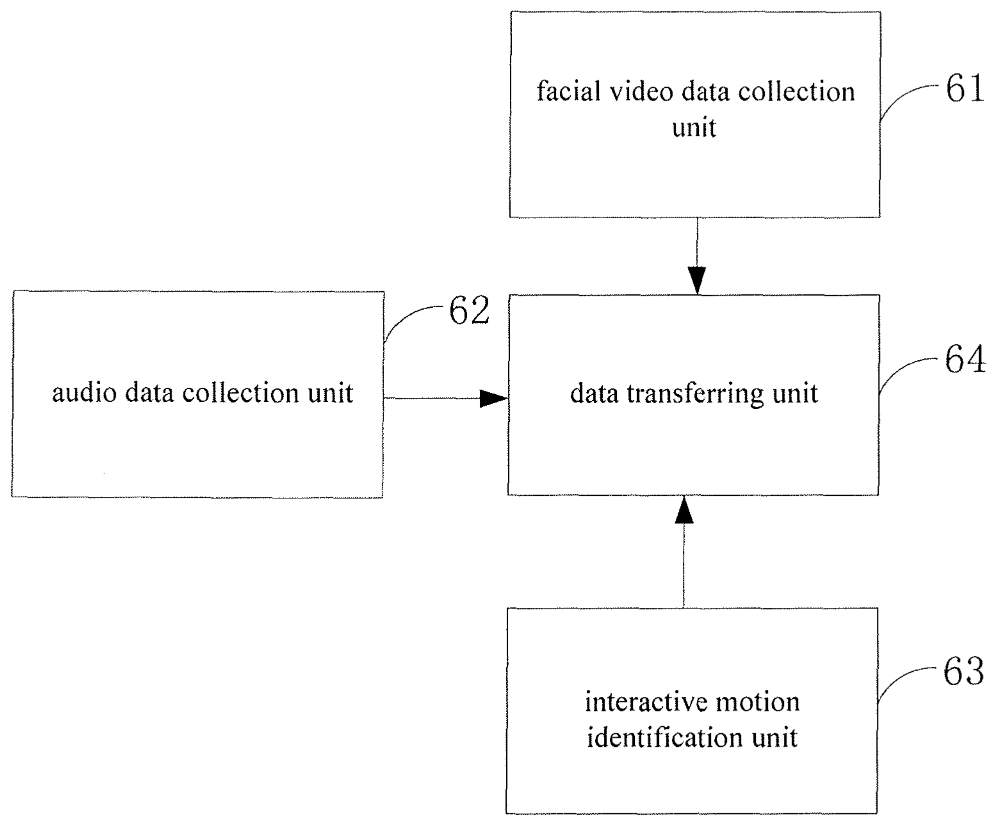
FIG. 6 is a schematic structural diagram of another example system for video communication.

FIG. 6 is a schematic structural diagram of another example system for video communication. FIG. 6 only illustrates parts of the system relevant for the description of the further embodiment. The device may be a software unit, a hard-ware unit or a combination of both, installed on or used with a mobile terminal.

The video communication system may include a facial video data collection unit 61, an audio data collection unit 62, an interactive motion identification unit 63, and a data transferring unit 64.

The facial video data collection unit 61 may collect facial video data of a user of a first client. The facial video data collection unit 61 may also identify facial vector data of the user of the first client according to the facial video data.

The data transferring unit 64 may transmit the facial vector data to the second client 12. The second client 12 may render the facial vector data of the user of the first client to generate a virtual profile model of the user of the first client. The second client 12 may also displays the virtual profile model of the user of the first client.

In addition to the sixth embodiment, the system described here, may further include an audio data collection unit 62 which may collect audio data of the user of the first client.

The data transferring unit 64 may mark the facial vector data and the audio data of the user of the first client with a timestamp. The data transferring unit 64 may further transmit the audio and vector data, with the timestamps, to the second client 12. The second client 12 may display the virtual profile model of the user of the first client, and play the sound in the audio data synchronously using the timestamp.

Alternatively, or in addition, the system may further include an interactive motion identification unit 63. The interactive motion identification unit 63 may receive the interactive motion button chosen by the user of the first client. The interactive motion button may be chosen from the interactive UI component library. The interactive motion identification unit 63 may identify the interactive motion button to obtain the interactive motion information. The interactive UI component library may include a face touch interactive motion button and a specific function interactive motion button, among several others.

The data transferring unit 64 may further transmit the interactive motion information to the second client 12. The second client 12 may jointly render the interactive motion information and the facial data information of the user of the second client. The second client 12 may, thus, generate a virtual profile model of the user of the second client. The second client 12 may then display the virtual profile model of the user of the second client.

The video communication system according to this embodiment may be used in the aforesaid corresponding second and third method embodiments, details of which can be referred to the description of the aforesaid second and third embodiments.

The Eighth Embodiment

Figure 7:
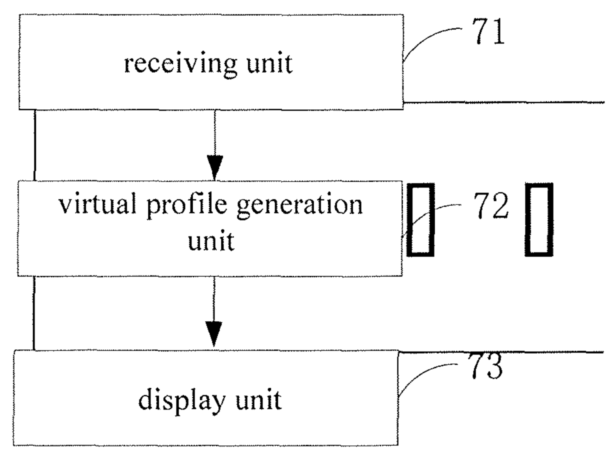
FIG. 7 is a schematic structural diagram of yet another example system for video communication.

FIG. 7 is a schematic structural diagram of yet another example system for video communication. FIG. 8 only illustrates parts of the system relevant for the description of the further embodiment. The device may be a software unit, a hard-ware unit or a combination of both, installed on or used with a mobile terminal.

The video communication system may include a receiving unit 71, a virtual profile generation unit 72 and a display unit 73.

The receiving unit 71 may receive facial vector data of a user of a first client transmitted by the first client 11.

The virtual profile generation unit 72 may render the facial vector data of the user of the first client to generate a virtual profile model of the user of the first client.

The display unit 73 may display the virtual profile model of the user of the first client.

Alternatively, or in addition, the receiving unit 71 may receive interactive motion information transmitted by the first client 11. In such a case, the virtual profile generation unit 72 may render the interactive motion information together with the facial data information of a user of a second client and generate a virtual profile model of the user of the second client.

The display unit 73 may also display the virtual profile model of the user of the second client.

Alternatively, or in addition, the virtual profile generation unit 72 may perform cartoon rendering of the facial vector data of the user of the first client to generate a virtual cartoon profile model of the user of the first client. In such case, the display unit 73 may display the virtual cartoon profile model of the user of the first client.

The video communication system according to this embodiment may be used in the aforesaid corresponding fourth and fifth method embodiments, details of which may be referred to in the description of the aforesaid fourth and fifth embodiments.

The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit. Besides, specific names of all the functional units are exemplary, and just for the convenience and distinction from each other and shall not be construed as a restriction to the scope of protection of the present disclosure.

Moreover, it can be understood by those with ordinary skill in the art that all or part of the steps in method embodiments can be achieved by programs giving instructions to relevant hardware to perform necessary steps. Programs including such instructions may be stored in any computer readable storage medium such as Read-Only Memory (ROM) or Random Access Memory (RAM), Magnetic Disk or Optical Disk, or any other form of computer readable memory storage.

Various embodiments described herein can be used alone or in combination with one another. The foregoing detailed description has described only a few of the many possible implementations of the present disclosure. For this reason, this description of example embodiments is intended by way of illustration, and not by way of limitation. Any equivalent solutions with slight structural or operational alterations made from the content of the specification and drawings of the present disclosure or any direct or indirect application in other related technical fields, etc. are included in the scope of the present disclosure.

What is claimed is:

1. A video communication method, comprising:

collecting a first facial video data of a user of a first client;

transmitting the first facial video data of the user of the first client to a second client;

collecting second facial video data and audio data associated with the user of the first client,. and interactive motion information received by the first client from an interactive user-interface (UI) component library;

identifying facial vector data associated with the user of the first client according to the second facial video data;

transmitting the facial vector data and the audio data to the second client, wherein the second client renders a virtual profile model corresponding to the user of the first client based on the first facial video data and the facial vector data, and wherein the second client displays the virtual profile model of the user of the first client, and further the second client plays the audio data of the user of the first client synchronously with the display of the virtual profile model of the user of the first client; and transmitting the interactive motion information to the second client, wherein the second client renders an animation corresponding to the interactive motion information, wherein the animation comprises modifying an expression of the virtual profile of the first client and an expression of a virtual profile model corresponding to a user of the second client, and wherein the second client displays the animation that comprises an interaction between the virtual profile model of the user of the second client synchronously with the display of the virtual profile model of the user of the first client.

2. The video communication method according to claim 1, wherein collecting the interactive motion information received by the first client in the interactive UI component library further comprises receiving data representative of an interactive motion button chosen by the user of the first client from the interactive UI component library; and identifying the interactive motion button to obtain the interactive motion information, wherein the interactive UI component library comprises a face touch interactive motion button and a specific function interactive motion button.

3. The video communication method according to claim 1, wherein the step of transmitting the facial vector data and the audio data to the second client further comprises:

marking the facial vector data and the audio data of the user of the first client with a timestamp; and transmitting the facial vector data and the audio data with the timestamp to the second client, wherein the second client displays the virtual profile model of the user of the first client according to the timestamp and plays a sound in the audio data synchronously with the virtual profile model of the user of the first client.

4. A video communication method, comprising:

collecting facial video data of a user of a first client and identifying facial vector data of the user of the first client according to the facial video data;

transmitting the facial vector data of the user of the first client to a second client, wherein the second client renders the facial vector data of the user of the first client to generate a virtual profile model of the user of the first client and the second client displays the virtual profile model of the user of the first client;

receiving an instruction indicative of an interactive motion button chosen by the user of the first client from an interactive UI component library and identifying the interactive motion button so as to obtain interactive motion information, wherein the interactive UI component library comprises a face touch interactive motion button and a specific function interactive motion button; and transmitting the interactive motion information to the second client, wherein the second client jointly renders the interactive motion information with facial data information associated with a user of the second client to generate an animation using a virtual profile model of the user of the second client and the virtual profile model of the user of the first client according to an action indicated by the interactive motion.

5. The video communication method according to claim 4, further comprising:

collecting audio data of the user of the first client;

marking the facial vector data and the audio data of the user of the first client with a timestamp; and transmitting the facial vector data and the audio data with the timestamp to the second client, wherein the second client displays the virtual profile model of the user of the first client and plays a sound in the audio data synchronously the virtual profile model of the user of the first client according to the timestamp.

6. A video communication method, comprising:

receiving facial vector data of a user of a first client transmitted by the first client;

rendering the facial vector data of the user of the first client to generate a virtual profile model of the user of the first client;

displaying the virtual profile model of the user of the first client;

receiving interactive motion information transmitted by the first client;

jointly rendering the interactive motion information and facial data information associated with a user of a second client to generate a virtual profile model of a user of the second client; and displaying the virtual profile model of the user of the second client, wherein rendering the interactive motion comprises animating the virtual profile model of the user of the first client and the virtual profile model of the user of the second client according to an action indicated by the interactive motion.

7. The video communication method according to claim 6, wherein the rendering the facial vector data of the user of the first client to generate the virtual profile model of the user of the first client and displaying the virtual profile model of the user of the first client further comprises:

performing cartoon rendering of the facial vector data of the user of the first client to generate a virtual cartoon profile model of the user of the first client; and displaying the virtual cartoon profile model of the user of the first client.

8. A video communication system, comprising:

a facial video data collection unit configured to collect facial video data of a user of a first client and further configured to identify facial vector data of the user of the first client according to the facial video data;

a data transferring unit configured to transmit the facial vector data to a second client, wherein the second client is configured to render the facial vector data of the user of the first client to generate a virtual profile model of the user of the first client and the second client is further configured to display the virtual profile model of the user of the first client;

an interactive motion identification unit configured to receive an indication of an interactive motion button chosen by the user of the first client from an interactive UI component library and further configured to identify the interactive motion button so as to obtain interactive motion information, wherein the interactive UI component library comprises a face touch interactive motion button and a specific function interactive motion button; and the data transferring unit is further configured to transmit the interactive motion information to the second client, wherein the second client is configured to render the interactive motion information jointly with facial data information associated with a user of the second client to generate an animation using a virtual profile model of the user of the second client and the virtual profile model of the user of the first client according to an action indicated by the interactive motion.

9. The video communication system according to claim 8, further comprising:

an audio data collection unit configured to collect audio data of the user of the first client; and wherein the data transferring unit is further configured to mark the facial vector data and the audio data with a timestamp and transmit the same to the second client, wherein the second client is further configured to display the virtual profile model of the user of the first client and play the audio data synchronously with the virtual profile model of the user of the first client, according to the timestamp.

10. A video communication system, comprising:

a receiving unit configured to receive facial vector data of a user of a first client transmitted by the first client;

a virtual profile generation unit configured to render the facial vector data of the user of the first client to generate a virtual profile model of the user of the first client; and a display unit configured to display the virtual profile model of the user of the first client;

wherein the receiving unit is further configured to receive interactive motion information transmitted by the first client;

the virtual profile generation unit is further configured to jointly render the interactive motion information with facial data information associated with a user of a second client to generate a virtual profile model of a user of the second client; and the display unit is further configured to display the virtual profile model of the user of the second client, wherein the interactive motion comprises animation of the virtual profile model of the user of the first client and the virtual profile model of the user of the second client according to an action indicated by the interactive motion.

11. The video communication system according to claim 10, wherein the virtual profile generation unit is further configured to perform cartoon rendering of the facial vector data of the user of the first client to generate a virtual cartoon profile model of the user of the first client; and the display unit is further configured to display the virtual cartoon profile model of the user of the first client.

12. A non-transitory storage medium, in which processor executable instructions are stored, comprising:

instructions to collect facial video data and audio data of a user of a first client and interactive motion information received by the first client from an interactive user-interface (UI) component library;

instructions to identify facial vector data of the user of the first client based on the facial video data;

instructions to transmit the facial vector data and the audio data to a second client, wherein the second client renders the facial vector data of the user of the first client to generate a virtual profile model corresponding to the user of the first client, and the second client displays the virtual profile model of the user of the first client and plays the audio data of the user of the first client synchronously with the virtual profile model of the user of the first client; and instructions to transmit the interactive motion information to the second client, wherein the second client renders the interactive motion information jointly with facial data information associated with a user of the second client to generate a virtual profile model corresponding to the user of the second client and the second client displays the virtual profile model of the user of the second client simultaneously with the display of the virtual profile model of the user of the first client, wherein the interactive motion comprises animation of the virtual profile model of the user of the first client and the virtual profile model of the user of the second client according to an action indicated by the interactive motion.

13. The storage medium according to claim 12, further comprises:

instructions to receive information associated with an interactive motion button chosen by the user of the first client from the interactive UI component library; and instructions to identify the interactive motion button to obtain the interactive motion information corresponding to the interactive motion button, wherein the interactive UI component library comprises a face touch interactive motion button and a specific function interactive motion button.

14. The storage medium according to claim 12, further comprises:

instructions to mark the facial vector data and the audio data of the user of the first client with a timestamp; and instructions to transmit the facial vector data and the audio data with the timestamp to the second client, wherein the second client displays the virtual profile model of the user of the first client and synchronously plays the audio data with the virtual profile model of the user of the first client, according to the timestamp.

* * * * *